F. SHELTON.
DRAFT APPLIANCE.
APPLICATION FILED FEB. 16, 1916. RENEWED SEPT. 28, 1918.
1,284,157.  Patented Nov. 5, 1918.
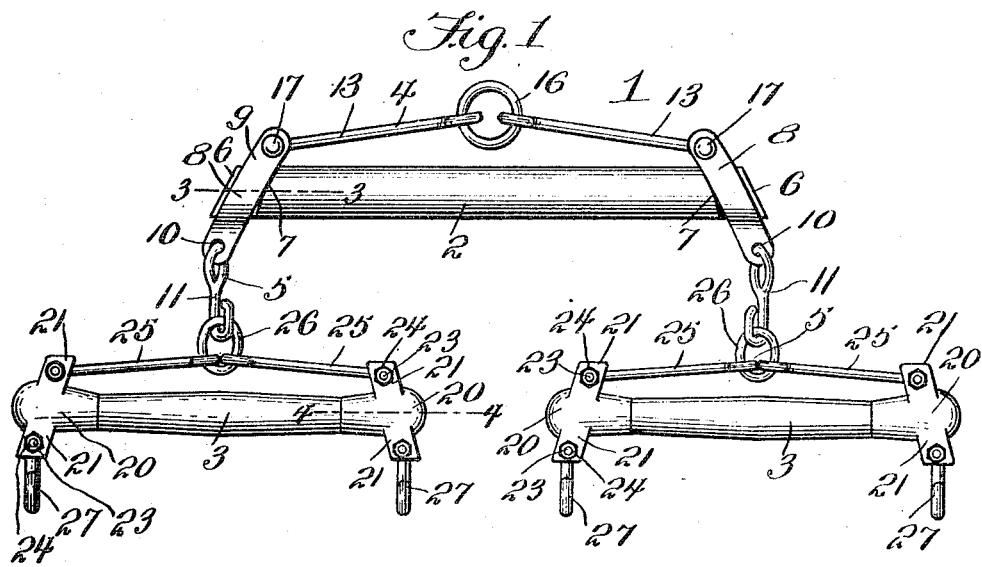
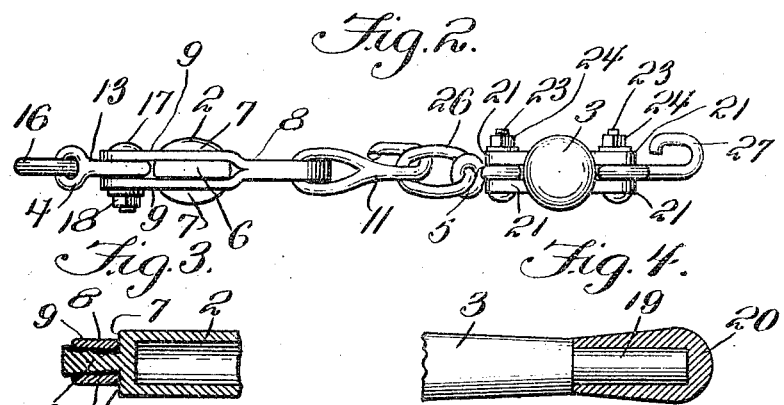
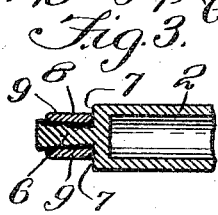
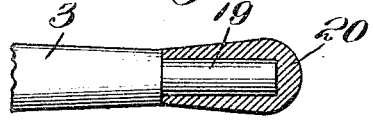
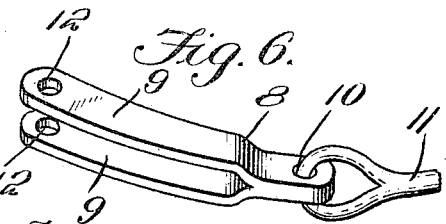
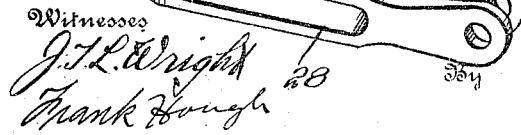
Inventor
Frank Shelton
Witnesses
J. L. Wright
Frank Hough
Victor J. Evans
Attorney

UNITED STATES PATENT OFFICE.

FRANK SHELTON, OF FOREST CITY, ARKANSAS.

DRAFT APPLIANCE.

1,284,157.  Specification of Letters Patent.  Patented Nov. 5, 1918.

Application filed February 16, 1916, Serial No. 78,681. Renewed September 28, 1918. Serial No. 256,143.

*To all whom it may concern:*

Be it known that I, FRANK SHELTON, a citizen of the United States, residing at Forest City, in the county of St. Francis and State of Arkansas, have invented new and useful Improvements in Draft Appliances, of which the following is a specification.

This invention relates to draft appliances and particularly to that type of appliance known as a double-tree or a swingle-tree.

The primary object of the invention is to provide an appliance of this character which is simple in construction, and which when used upon a vehicle will materially decrease the labor imposed upon an animal attached to the vehicle when asserting a dead pull thereon to start the same.

A further object of the invention is to provide a bar having flattened ends and clips which may be maintained in frictional contact with the flattened ends of the bar so that accidental displacement of the clips from the ends of the bar is impossible when said clips are connected with the vehicle or harness of the animal drawing the vehicle.

A still further object of the invention is to provide outwardly curved shoulders adjacent the flattened portion of the bar on opposite sides thereof with which said clips contact when a pull is exerted upon links connected therewith and attached to the vehicle.

A still further object of the invention is to provide the flattened ends of the bar with inclined faces upon opposite sides thereof upon which bear the inner faces of the spaced arms on the clips so that when a pull is exerted upon the means connected with the ends of the arms and with the vehicle movement of the clips toward the flattened ends of the bar is prevented.

With these and other objects in view the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations and modifications within the scope of the appended claim may be resorted to when desired.

Like characters of reference denote corresponding parts throughout the several views in the drawing in which:—

Figure 1 is a top plan view of a draft appliance constructed in accordance with the invention.

Fig. 2 is an end elevation of the device on an enlarged scale.

Fig. 3 is a section on the line 3—3 of Fig. 1.

Fig. 4 is a sectional view on the line 4—4 of Fig. 1.

Fig. 5 is a detail perspective view of one of the caps removed from the end of one of the swingle-trees.

Fig. 6 is a detailed perspective view of one of the clips which is removably connected to the flattened end of the double-tree.

Fig. 7 is a detail perspective view of the modified form of clip for engagement with the flattened ends of the double-tree.

Referring now to the drawing in detail, the numeral 1 designates the draft appliance as a whole, comprising a double-tree 2, swingle-trees 3 and means for connecting the swingle-trees with the double-trees, and the double-trees with the vehicle as indicated by the numerals 4 and 5.

The double-tree which is preferably formed from a length of tubular material such as gas pipe, or the like, is reduced and flattened adjacent each end for a portion of its length, as indicated by the numeral 6, said reduced and flattened portions providing the double-tree with outwardly curved shoulders 7 at the inner ends of the reduced and flattened portions 6 which gradually decrease in thickness from their outer ends toward the shoulders 7.

Connected to the reduced and flattened ends of the doubletree 2 by means of spaced arms 9, are arcuate clips 8, the said arms being adapted to have interposed therebetween the inclined surfaces of the flattened ends 6 and curved to contact with the arcuately curved shoulders 7 on the doubletree 2.

Each clip 8 is provided with an opening 10 distant from the arms 9 and in which is movably mounted a hook 11, while each of the arms 9 is provided at one end thereof with a similar opening 12.

In order that the doubletree may be connected with a vehicle, links 13 are provided and have an eye in each end thereof, said links being connected by a ring 16 loosely passing through the eyes in one end of the links, while the opposite end of each link has the eye therein disposed between the arms 9 in the clips 8 and in alinement with the openings 12 in said arms.

Passing through the openings 12 in the ends of the arms 9 and through the eyes in the ends of the links 15 are bolts 17, each of which is threaded to receive a nut 18 by means of which the arms 9 are caused to frictionally contact with the flattened ends of the doubletree 2 and in this manner removably connect the clips 8 with the doubletree and the links 13 with the clips 8.

Each swingletree 3 is preferably formed of wood as the strain imposed thereon is less than that imposed upon the doubletree 2 and each swingletree has its ends reduced, as indicated by the numeral 19.

Removably mounted upon the reduced ends of the swingletree 3 are caps 20 provided upon opposite sides thereof in staggered relation spaced lugs 21, each of which is provided with an opening 22.

Passing through the openings 22 in each pair of lugs 21 is a bolt 23 having one end thereof threaded to receive a nut 24.

The bolts 23 and nuts 24 serve to secure to each swingletree and upon one side thereof links 25 connected by means of a ring 26 adapted for engagement with the hook 11 and the doubletree 2, while secured to the lugs on the opposite side of each swingletree and at each end thereof is a hook 27 adapted to be connected with the harness upon a draft animal connected with the vehicle to which the draft appliance is attached.

The modified form of the clip shown in Fig. 7 in the drawing is similar to that shown in Fig. 1 with the exception that the modified form of clip designated by the numeral 28 has its forward end bifurcated as at 29 to receive between the arms thereon the hook 11.

From the foregoing statement taken in connection with the accompanying drawing, it can be readily seen that when the draft appliance is applied to a vehicle, and draft animals connected with the swingletree 3, and the nut 18 adjusted on the bolts 17 to cause the arms 9 of the clips 8 to frictionally contact with the inclined faces on the reduced ends of the double-trees 2, the clips 8 will be prevented from becoming disengaged from the ends of the double-tree 2, while the strain upon the animal incident to the starting of the vehicle will be materially lessened.

It is also pointed out by disconnecting the swingle-tree from the double tree and removing the hook in the end of the swingle-tree either of the swingletrees may be used as a neck yoke when desired, by passing the wagon pole through the ring 26 and connecting the pole strap between the lugs on the side of the cap distant from those containing means for securing the swingletree to the wagon pole, and passing the bolts 23 through the pole strap and lugs.

From the foregoing statements taken in connection with the accompanying drawing it will be apparent that a draft attachment has been provided which is simple in construction, inexpensive of manufacture and entirely efficient in use.

Having thus described the invention what is claimed as new is:—

In a device of the class described, a double-tree having a flattened and reduced portion at each end thereof, said flattened and reduced portions gradually decreasing in thickness from their outer ends toward their inner ends, outwardly curved shoulders on said double-tree at the inner ends of said reduced and flattened portions, clips having spaced arms receiving there between said flattened and reduced portions, said arms being curved throughout their length to engage said shoulders, a bolt passing through said arms adjacent their free ends, and a nut adjustable on said bolt and bearing against one of said arms.

In testimony whereof I affix my signature in presence of two witnesses.

FRANK SHELTON.

Witnesses:
W. C. FLETCHER,
A. C. BRIDEWELL.

Copies of this patent may be obtained for five cents each, by addressing the "Commissioner of Patents, Washington, D. C."